United States Patent
Wang (10) Patent No.: US 9,742,268 B2
(45) Date of Patent: Aug. 22, 2017

(54) BOOST CONVERTER CIRCUIT AND A METHOD FOR CONTROLLING A BOOST CONVERTER

(71) Applicant: Intel Corporation, Santa Clara, CA (US)

(72) Inventor: Ping-Han Wang, New Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/847,219

(22) Filed: Sep. 8, 2015

(65) Prior Publication Data
US 2017/0005575 A1    Jan. 5, 2017

(30) Foreign Application Priority Data

Jul. 1, 2015   (CN) .......................... 2015 1 0378238

(51) Int. Cl.
| | |
|---|---|
| H02M 1/36 | (2007.01) |
| H02M 3/156 | (2006.01) |
| H02M 3/158 | (2006.01) |
| H02M 1/00 | (2006.01) |

(52) U.S. Cl.
CPC .......... *H02M 3/156* (2013.01); *H02M 3/1588* (2013.01)

(58) Field of Classification Search
CPC ...... H02M 1/36; H02M 3/156; H02M 3/1588; H02M 2001/0032
See application file for complete search history.

(56) References Cited

U.S. PATENT DOCUMENTS

| | | | |
|---|---|---|---|
| 6,329,801 B1 * | 12/2001 | Zuniga | H02M 3/1563 323/282 |
| 6,933,710 B2 | 8/2005 | Shieh | |

(Continued)

FOREIGN PATENT DOCUMENTS

| | | |
|---|---|---|
| CN | 1965463 A | 5/2007 |
| CN | 102025273 A | 4/2011 |

(Continued)

OTHER PUBLICATIONS

Office Action dated Jan. 11, 2017 for Chinese Patent Application No. 201510378238.2.

*Primary Examiner* — Adolf Berhane
*Assistant Examiner* — Sisay G Tiku
(74) *Attorney, Agent, or Firm* — Schiff Hardin LLP (57) ABSTRACT

A method for controlling a boost converter which generates an output voltage according to an input voltage. The boost converter includes an inductor, a first transistor, a second transistor, and a capacitor. The first transistor is coupled between the inductor and a ground. The second transistor is coupled between the inductor and an output terminal. The capacitor is coupled to both the second transistor and the output terminal. The method includes: charging the capacitor by repeatedly turning on the second transistor within a first time interval; turning on the first transistor and the second transistor by turns according to a first switching frequency within a second time interval; and turning on the first transistor and the second transistor by turns according to a second switching frequency within a third time interval. The first switching frequency is smaller than the second switching frequency.

8 Claims, 10 Drawing Sheets

(56) References Cited

U.S. PATENT DOCUMENTS

| | | | | |
|---|---|---|---|---|
| 8,638,077 B2* | 1/2014 | Saphon | ............... | H02M 3/156 |
| | | | | 323/271 |
| 2005/0057238 A1* | 3/2005 | Yoshida | ............... | H02M 3/156 |
| | | | | 323/282 |
| 2008/0094861 A1* | 4/2008 | Wang | ................ | H02M 3/156 |
| | | | | 363/21.11 |
| 2008/0238395 A1 | 10/2008 | Hasegawa | | |
| 2011/0221412 A1* | 9/2011 | Li | .................. | H05B 33/0815 |
| | | | | 323/283 |
| 2014/0159686 A1* | 6/2014 | Lee | ................... | H02M 3/156 |
| | | | | 323/282 |
| 2014/0375285 A1* | 12/2014 | Chen | ................. | H02M 3/158 |
| | | | | 323/271 |
| 2016/0056712 A1* | 2/2016 | Chen | ................. | H02M 1/44 |
| | | | | 323/271 |

FOREIGN PATENT DOCUMENTS

| | | |
|---|---|---|
| CN | 102195471 A | 9/2011 |
| CN | 103532378 A | 1/2014 |

\* cited by examiner

BOOST CONVERTER CIRCUIT AND A METHOD FOR CONTROLLING A BOOST CONVERTER

CROSS REFERENCE TO RELATED APPLICATIONS

This Application claims priority of China Patent Application No. 201510378238.2, filed on Jul. 1, 2015, the entirety of which is incorporated by reference herein.

BACKGROUND OF THE INVENTION

Field of the Invention

The invention relates to a control circuit, and more particularly to a control circuit for boost converter and a method for controlling a boost converter.

Description of the Related Art

An electronic device generally includes various components requiring different operating voltages. Therefore, a DC-DC voltage converter is essential for the electronic device to adjust and stabilize voltage levels. Based upon different power requirements, various types of DC-DC voltage converters, originating from a buck (step down) converter and a boost (step up) converter, have been developed. Accordingly, the buck converter can decrease an input DC voltage to a default voltage level, and the boost converter can increase an input DC voltage. With advances in circuit technology, both the buck and boost converters are varied and modified to conform to different system architectures and requirements.

Generally, a boost converter can operate in a Pulse Width Modulation (PWM) mode and a Pulse Frequency Modulation (PFM) mode. Both the PWM mode and PFM mode have their corresponding merits and drawbacks. For example, if the boost converter directly operates in the PWM mode when the electronic device is just starting up (also known as a boot-up), an over-current problem (that is, the amount of current exceeding a predetermined threshold) will occur.

Therefore, a boost converter and a method for controlling a boost converter to avoid the over-current problem when the electronic device starts up (or boots up) are required to avoid generating an excessively large inductor current, and to protect the electronic components from being damaged by the excessively large current.

BRIEF SUMMARY OF THE INVENTION

A boost converter circuit and a method for controlling a boost converter are provided. An exemplary embodiment of a boost converter circuit comprises a boost converter and a control circuit. The boost converter generates an output voltage at an output terminal according to an input voltage. The boost converter comprises an inductor, a first transistor coupled between the inductor and a ground, and being turned on or off according to a first control signal. It also comprises a second transistor coupled between the inductor and the output terminal, and being turned on or off according to a second control signal. The control circuit is coupled to the boost converter and generates the first control signal and the second control signal according to a clock signal. The control circuit controls the first transistor and the second transistor turning on by turns according to a first switching frequency in a predetermined time interval. The first switching frequency is smaller than a frequency of the clock signal.

An exemplary embodiment of a method for controlling a boost converter which generates an output voltage according to an input voltage and comprises an inductor, a first transistor coupled between the inductor and a ground, a second transistor coupled between the inductor and an output terminal and a capacitor coupled to the second transistor and the output terminal, comprises: keep turning on the second transistor in a first time interval for charging the capacitor; turning on the first transistor and the second transistor by turns according to a first switching frequency in a second time interval; and turning on the first transistor and the second transistor by turns according to a second switching frequency in a third time interval, wherein the first switching frequency is smaller than the second switching frequency.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
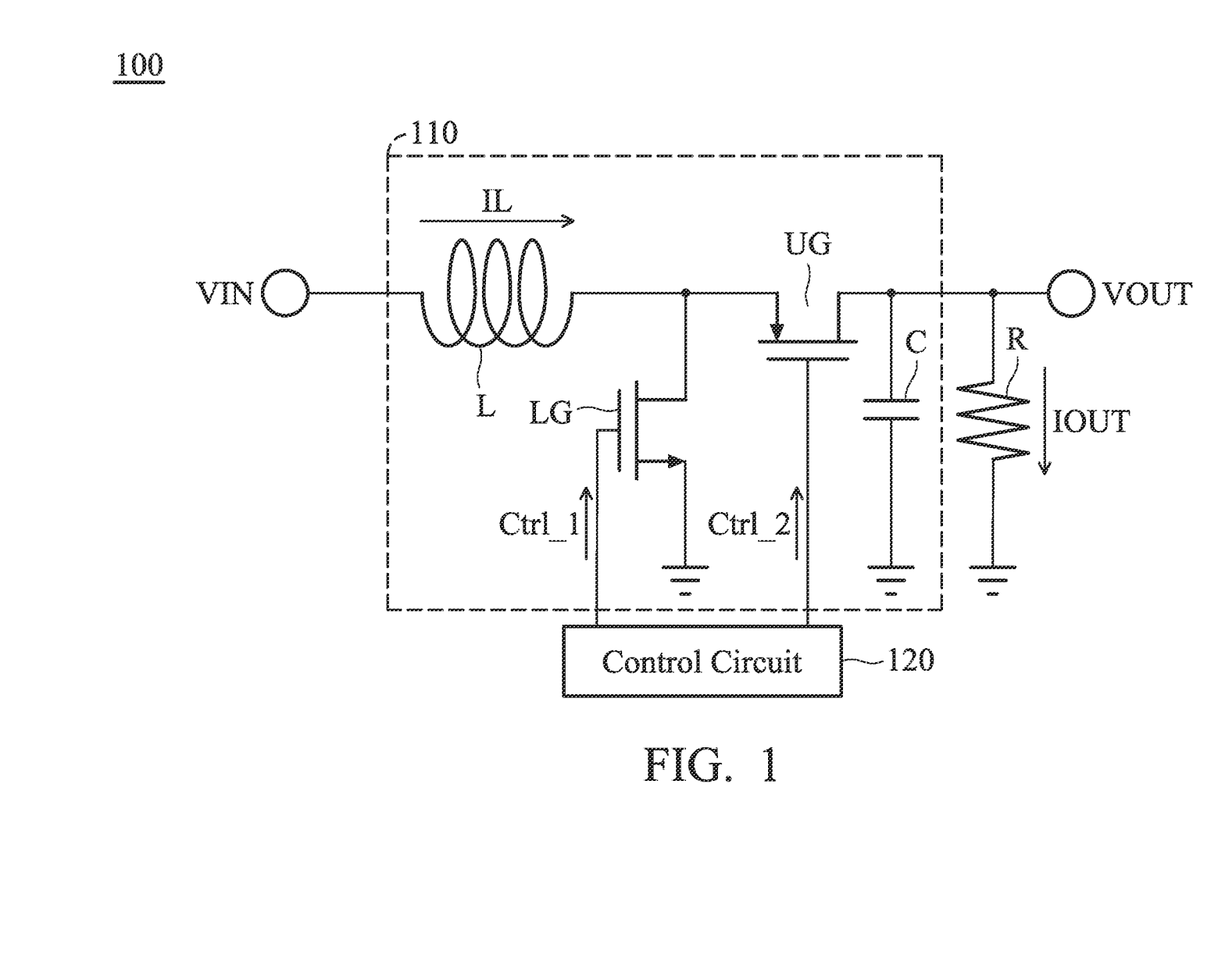
FIG. 1 is a block diagram of an embodiment of a boost converter circuit according to an embodiment of the invention.

FIG. 1 is a block diagram of an embodiment of a boost converter circuit according to an embodiment of the invention. The boost converter circuit 100 may comprise a boost converter 110 and a control circuit 120. The boost converter 110 generates an output voltage VOUT at an output terminal according to an input voltage VIN. The boost converter 110 comprises an inductor L, a transistor LG coupled between the inductor L and a ground, a transistor UG coupled between the inductor L and the output terminal and a capacitor C coupled to the transistor UG and the output terminal. The control circuit 120 is coupled to the boost converter 110 and generates control signals Ctrl_1 and Ctrl_2 according to a clock signal CLK. The transistor LG receives the control signal Ctrl_1 and is turned on or off according to the control signal Ctrl_1. The transistor UG receives the control signal Ctrl_2 and is turned on or off according to the control signal Ctrl_2.

Generally, the boost converter can operate in a Pulse Width Modulation (PWM) mode and a Pulse Frequency Modulation (PFM) mode.

Figure 2:
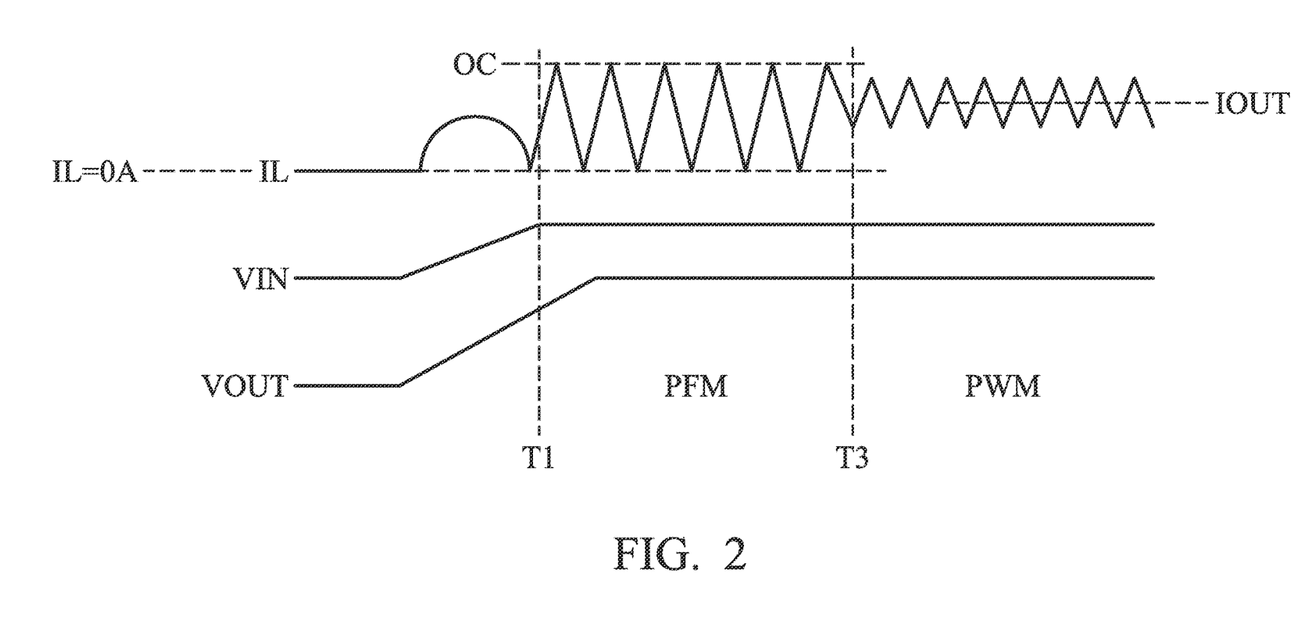
FIG. 2 is a schematic diagram showing exemplary signal waveforms when a boost converter starts up.

FIG. 2 is a schematic diagram showing exemplary signal waveforms when a boost converter starts up (or boots up). As shown in FIG. 2, in the predetermined time interval T1~T3, the boost converter operates in the PFM mode, and after the time T3, the boost converter operates in the PWM mode. The time T1 may be set as the transient time right when the output voltage VOUT is boosted from a value that is smaller than the input voltage VIN to a value that is greater the input voltage VIN, and the time T3 may be set as the time after the time T1 and having a predetermined time span with respect to the time T1, or may be set as the time when the output voltage VOUT can be generated stably.

In the PFM mode, the transistors LG and UG are turned on by turns. When the slope of the inductor current IL is positive, the transistor LG is turned on. The transistor LG is turned on until the inductor current IL achieves the over current level OC. When the inductor current IL achieves the over current level OC, the transistor LG is turned off and the transistor UG is turned on. When the transistor UG is turned on, the slope of the inductor current IL changes from positive to negative. After the output voltage VOUT is stably greater than the input voltage VIN for a period, that is, after the time T3, the boost converter operates in the PWM mode.

Figure 3:
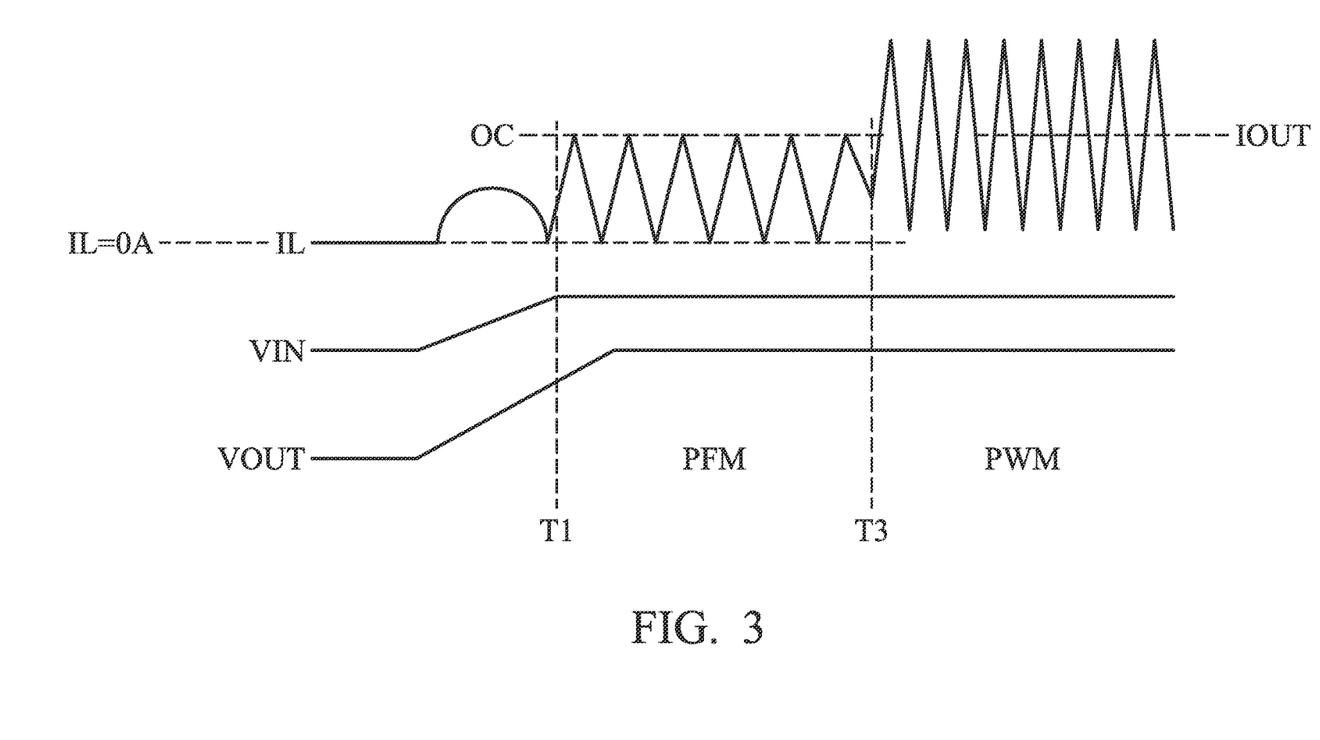
FIG. 3 is another schematic diagram showing exemplary signal waveforms when a boost converter starts up.

FIG. 3 is another schematic diagram showing exemplary signal waveforms when a boost converter starts up (or boots up). The scenario shown in FIG. 3 is the one when the loading R coupled to the boost converter is heavy, and the scenario shown in FIG. 2 is the one when the loading R coupled to the boost converter is light. As shown in FIG. 2 and FIG. 3, when the loading R coupled to the boost converter is light, in the predetermined time interval T1~T3, the inductor current IL is greater than the average current IOUT flowing through the load R. However, the large inductor current IL becomes an inrush current for the load R or other electronic components in the circuit. The sudden inrush current may cause the lifespan of the electronic components to be reduced. Therefore, a control circuit for controlling a boost converter and the controlling method thereof are proposed to avoid generating an excessively large inductor current when the boost converter starts up (or boots up) and protect the electronic components of the electronic device or the overall system from being damaged by the excessively large current.

According to an embodiment of the invention, the control circuit 120 may control the transistors LG and UG to be turned on by turns in the predetermined time interval T1~T3 according to a relatively low switching frequency, and may control the transistor UG to be turned on right after the transistor LG is turned on for a short period. In this manner, the inductor current IL generated when the booster converter starts up (or boots up) can be effectively reduced, and the over current problem discussed above can be solved.

Figure 4:
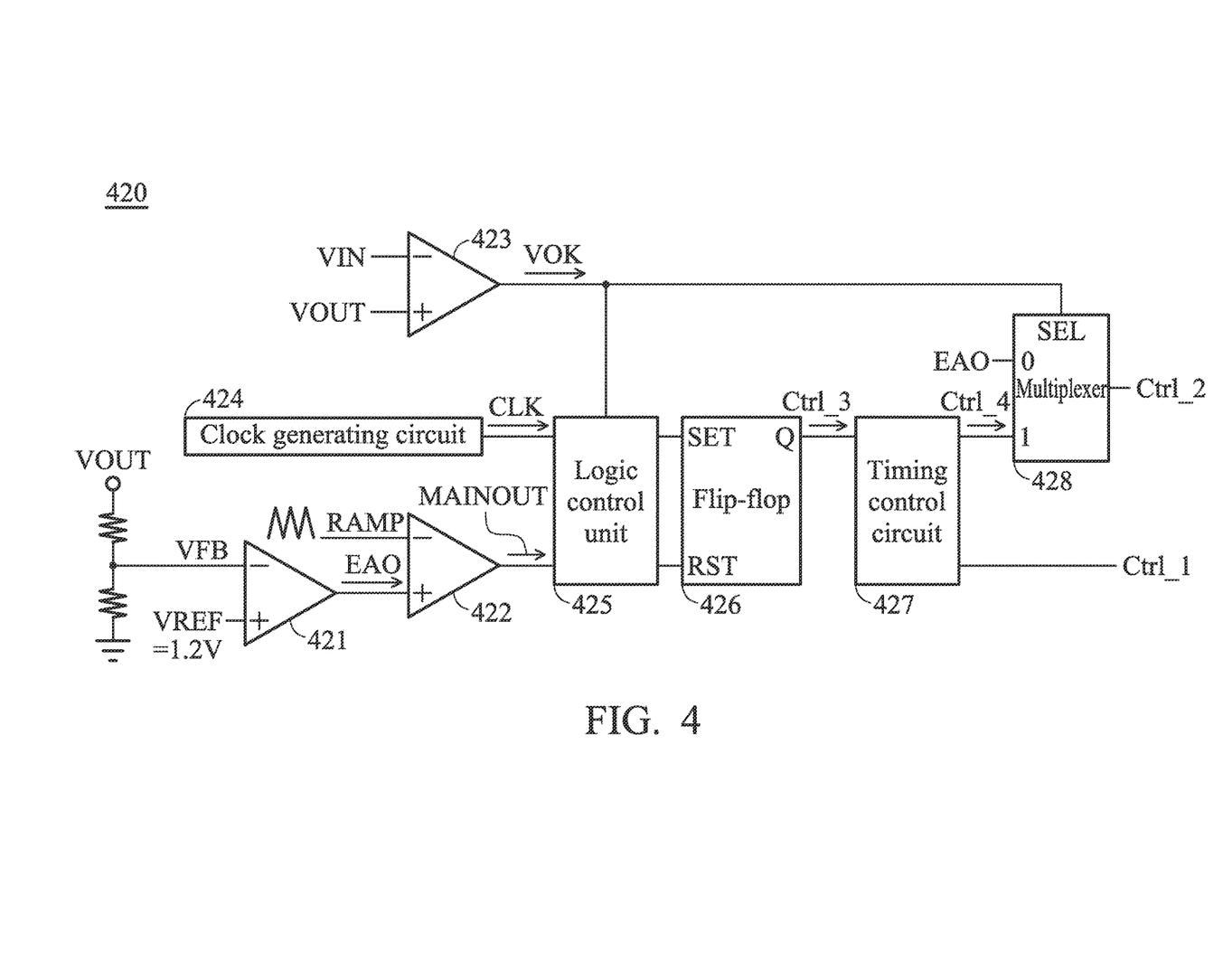
FIG. 4 shows a block diagram of the control circuit according to an embodiment of the invention.

FIG. 4 shows a block diagram of the control circuit according to an embodiment of the invention. According to an embodiment of the invention, the control circuit 420 may comprise a plurality of comparators, such as the comparators 421, 422 and 423, a clock generating circuit 424, a logic control unit 425, a flip-flop 426, a timing control circuit 427 and a multiplexer 428. The comparator 421 compares a divided voltage with a reference VREF to generate a compare signal EAO. The divided voltage is a feedback voltage VFB generated according to the output voltage VOUT. The comparator 422 compares a reference signal RAMP with the compare signal EAO to generate the main-output signal MAINOUT. The comparator 423 compares the input voltage VIN with the output voltage VOUT to generate a start-up signal VOK.

The clock generating circuit 424 provides the clock signal CLK. The logic control unit 425 receives the clock signal CLK, the start-up signal VOK and the main-output signal MAINOUT, and generates a set signal SET and a reset signal RST according to the clock signal CLK, the start-up signal VOK and the main-output signal MAINOUT. The flip-flop 426 is coupled to the logic control unit 425 for outputting a control signal Ctrl_3 according to the set signal SET and the reset signal RST. The timing control circuit 427 is coupled to the flip-flop 426 for generating the control signals Ctrl_1 and Ctrl_4 according to the control signal Ctrl_3. The multiplexer 428 selectively outputs either the control signal Ctrl_4 or the compare signal EAO as the control signal Ctrl_2 according to the start-up signal VOK.

Figure 5:
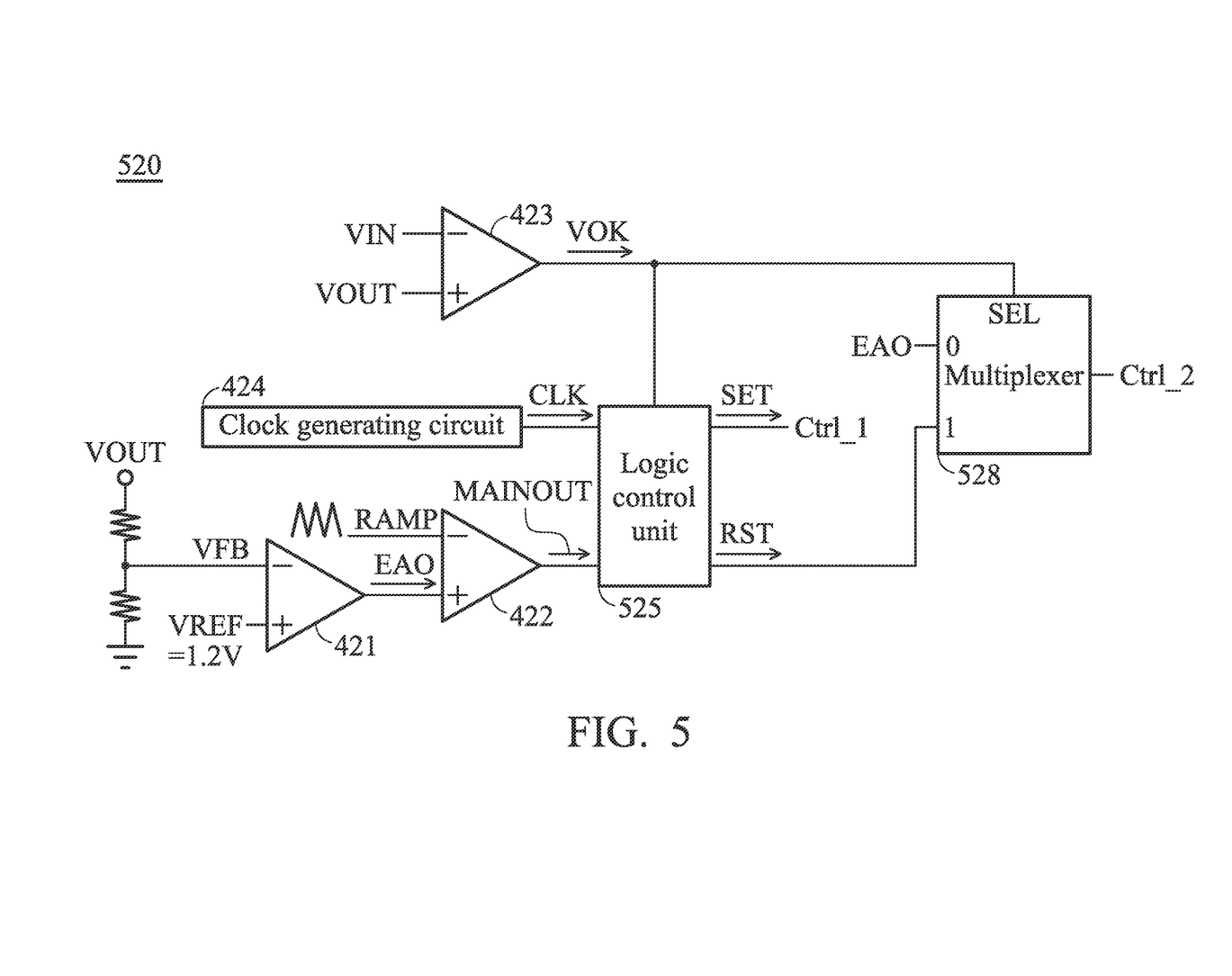
FIG. 5 shows a block diagram of the control circuit according to another embodiment of the invention.

FIG. 5 shows a block diagram of the control circuit according to another embodiment of the invention. The control circuit 520 may comprises a plurality of comparators, such as the comparators 421, 422 and 423, a clock generating circuit 424, a logic control unit 525 and a multiplexer 528. Most of the components in the control circuit 520 are the same as the control circuit 420. Therefore, the corresponding descriptions may refer to those of FIG. 4, and are omitted here for brevity.

In this embodiment, the logic control unit 525 directly output the set signal SET as the control signal Ctrl_1. The multiplexer 528 selectively outputs either the reset signal RST or the compare signal EAO as the control signal Ctrl_2.

Figure 6:
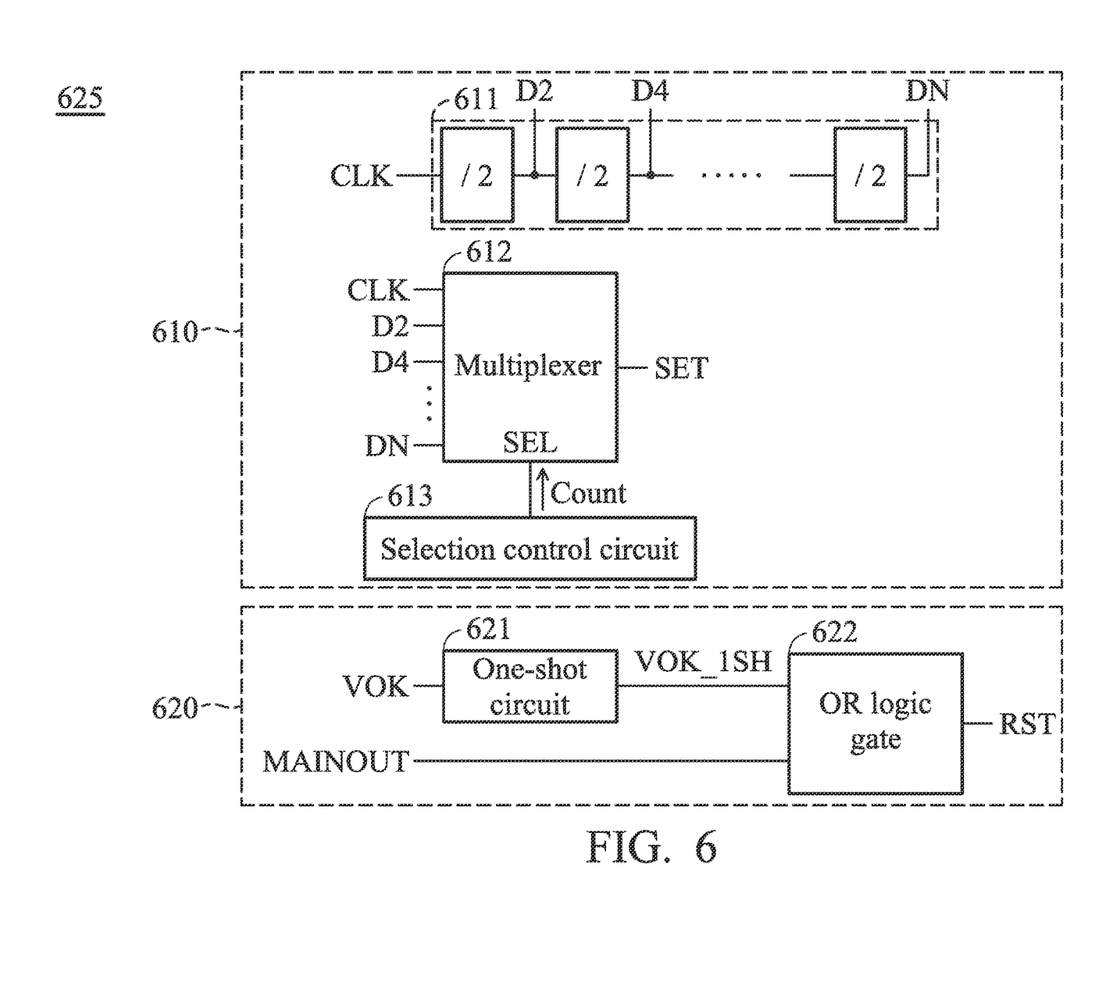
FIG. 6 shows a circuit diagram of a logic control unit according to an embodiment of the invention.

FIG. 6 shows a circuit diagram of a logic control unit according to an embodiment of the invention. According to an embodiment of the invention, the logic control unit 625 may comprise the circuit subunit 610 for generating the set signal SET according to the clock signal CLK and the circuit subunit 620 for generating the reset signal RST according to the main-output signal MAINOUT. The circuit subunit 610 may comprise a divider circuit 611, a multiplexer 612 and a selection control circuit 613. The divider circuit 611 receives the clock signal CLK and divides a frequency of the clock signal CLK to generate one or more divided signals D2, D4 . . . DN, where N is a positive integer. The multiplexer 612 receives the clock signal CLK and the one or more divided signals D2, D4 . . . DN and selectively outputs either the clock signal CLK or the divided signals D2, D4 . . . DN as the set signal SET according to a control signal Count. The selection control circuit 613 generates the control signal Count according to the control logic that the overall system requires.

In an embodiment of the invention, the selection control circuit 613 may comprise a counter and may generate the control signal Count according to a counting result of the counter. For example, when the counter counts to a first value, the control signal Count output by the selection control circuit 613 may have a first level, so as to control the multiplexer 612 to output the divided signal D4 having a frequency that is ¼ of that of the clock signal CLK. When the counter counts to a second value, the control signal Count output by the selection control circuit 613 may have a second level, so as to control the multiplexer 612 to output the divided signal D2 having a frequency that is ½ of that of the clock signal CLK.

The circuit subunit 620 may comprise a one-shot circuit 621 and an OR logic gate 622. The one-shot circuit 621 generates a one-shot signal VOK_1SH according to a start-up signal VOK. For example, the one-shot circuit 621 may generate the one-shot signal VOK_1SH when detecting a rising edge (or falling edge) of the start-up signal VOK and after wait for a very short period. The OR logic gate 622 receives the one-shot signal VOK_1SH and the main-output signal MAINOUT and outputs an OR logic operation result of the one-shot signal VOK_1SH and the main-output signal MAINOUT as the reset signal RST.

Figure 7:
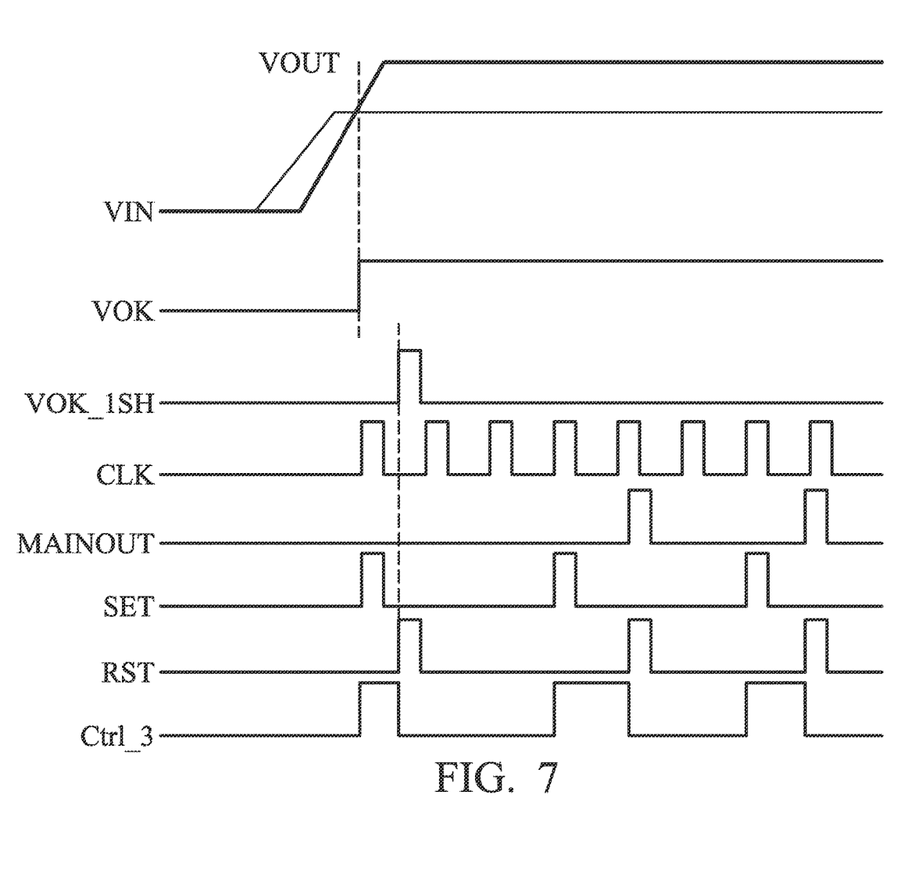
FIG. 7 is a schematic diagram showing exemplary signal waveforms according to an embodiment of the invention.

FIG. 7 is a schematic diagram showing exemplary signal waveforms according to an embodiment of the invention. As shown in FIG. 7, when the output voltage VOUT is boosted from a value that is smaller than the input voltage VIN to a value that is greater the input voltage VIN, the start-up signal VOK changes from a low voltage level to a high voltage level. After detecting a rising edge (or receiving the high voltage level) of the start-up signal VOK and wait for a very short period, the one-shot circuit 621 generates the one-shot signal VOK_1SH, where the one-shot signal VOK_1SH comprises a pulse.

According to an embodiment of the invention, since the set signal SET is the frequency division result of the clock signal CLK, a frequency of the set signal SET is smaller than a frequency of the clock signal CLK. In addition, since the reset signal RST is the OR logic operation result of the one-shot signal VOK_1SH and the main-output signal MAINOUT, the first pulse of the reset signal RST is generated based on the pulse of the one-shot signal VOK_1SH and the remaining pulses of the reset signal RST are generated based on the pulses of the main-output signal MAINOUT. The control signal Ctrl_3 is generated by the flip-flop 426 according to the set signal SET and the reset signal RST. The output logic of the flip-flop 426 is that: when the set signal SET has a high voltage level and the reset signal RST has a low voltage level, the control signal Ctrl_3 has a high voltage level; when the set signal SET has a low voltage level and the reset signal RST has a high voltage level, the control signal Ctrl_3 has a low voltage level; when both the set signal SET and the reset signal RST have a low voltage level, the control signal Ctrl_3 retains its original voltage level unchanged; and it is not allowed for the both the set signal SET and the reset signal RST to have a high voltage level.

Figure 8:
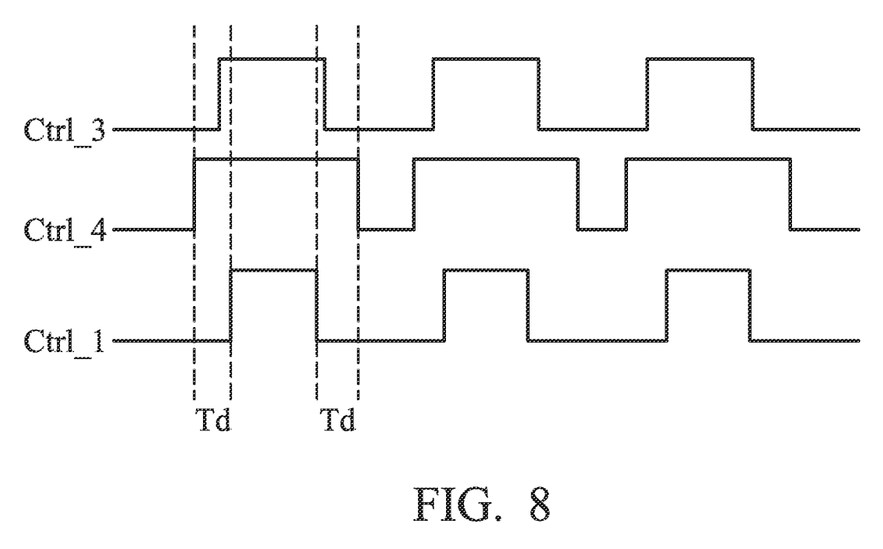
FIG. 8 shows the control signal waveforms according to an embodiment of the invention.

FIG. 8 shows the control signal waveforms according to an embodiment of the invention. According to an embodiment of the invention, the timing control circuit 427 generates the control signals Ctrl_1 and Ctrl_4 according to the control signal Ctrl_3. The timing control circuit 427 staggers the rising edges and falling edges of the control signals Ctrl_1 and Ctrl_4, so as to generate the control signals with non-overlapped rising edges and falling edges, such that the transistors LG and UG will not be turned on at the same time. As shown in FIG. 8, there is a time span Td between the rising edge and falling edge of the control signals Ctrl_1 and Ctrl_4, and the timing control circuit 427 controls the time span Td not to be zero.

Figure 9:
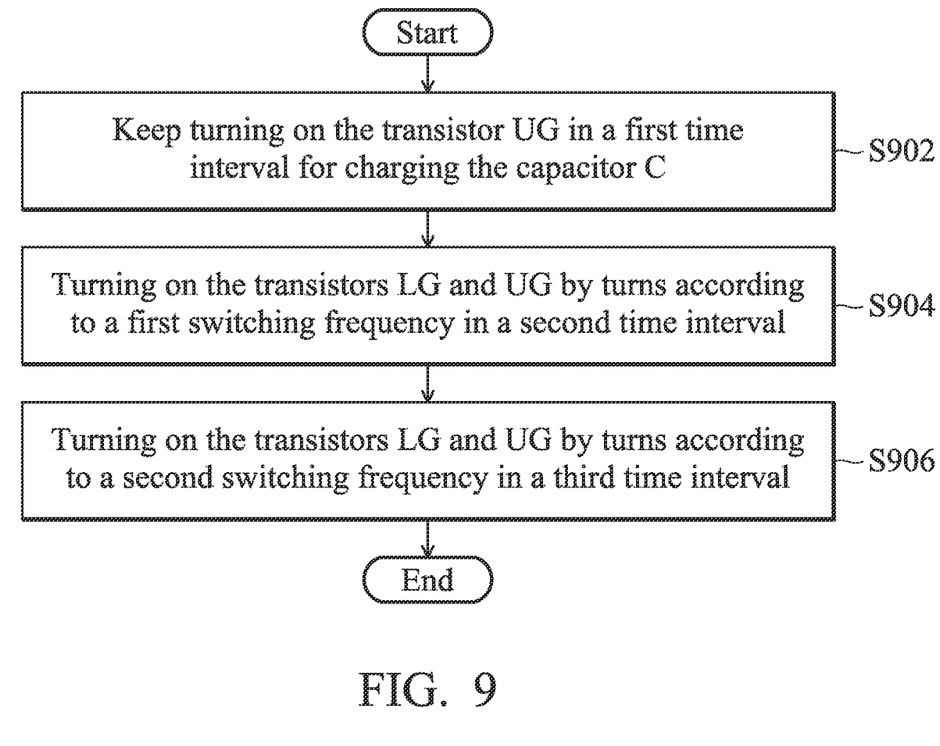
FIG. 9 is a flow chart of a method for controlling a boost converter according to an embodiment of the invention.
Figure 10:
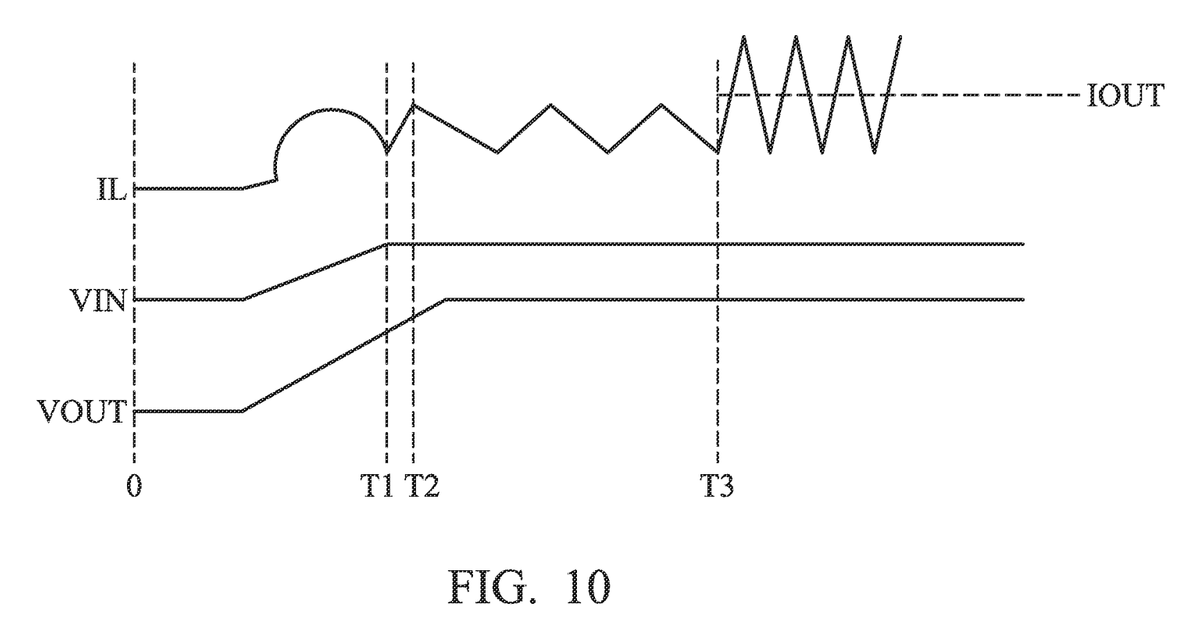
FIG. 10 is a schematic diagram showing exemplary signal waveforms when a boost converter starts up according to an embodiment of the invention.

FIG. 9 is a flow chart of a method for controlling a boost converter according to an embodiment of the invention. FIG. 10 is a schematic diagram showing exemplary signal waveforms when a boost converter starts up according to an embodiment of the invention. Combining FIG. 9 and FIG. 10, the proposed controlling method for controlling a boost converter is discussed in more detailed in the following paragraphs.

First of all, the control circuit keeps turning on the transistor UG in a first time interval for charging the capacitor C (Step S902). Referring to FIG. 10, the time T1 may be set as the transient time right when the output voltage VOUT is boosted from a value that is smaller than the input voltage VIN to a value that is greater the input voltage VIN. Therefore, the first time interval here refers to the time interval from 0 to T1. In other words, in the first time interval, the output voltage VOUT is smaller than the input voltage VIN.

According to an embodiment of the invention, when the output voltage VOUT is smaller than the input voltage VIN, the compare signal EAO generated by comparing the feedback signal VFB with the reference voltage VREF may have a predetermined value. Similarly, when the output voltage VOUT is smaller than the input voltage VIN, the start-up signal VOK generated by comparing the input voltage VIN with the output voltage VOUT may have another predetermined value. Meanwhile, the multiplexer 428/528 may select and output the compare signal EAO as the control signal Ctrl_2 according to the to the value of the start-up signal VOK, so as to control the transistor UG to keep being turned on.

Next, the control circuit turns on the transistors LG and UG by turns according to a first switching frequency in a second time interval (Step S904). Referring to FIG. 10, the second time interval here refers to the time interval from T1 to T3. In the second time interval, the output voltage VOUT is greater than the VIN. Note that in an embodiment of the invention, the step S904 may further comprise: turning off the transistor UG and turning on the transistor LG when the output voltage VOUT is boosted from a value that is smaller than the input voltage VIN to a value that is greater the input voltage VIN; and after turning on the transistor LG for a short period, turning off the transistor LG and turning on the transistor UG right away. As shown in FIG. 10, the transistor LG is turned off and the transistor UG is turned on at time T2. According to an embodiment of the invention, the one-shot circuit 621 may facilitate to turn on the transistor UG right away after turning on the transistor LG for a short period. Rapidly turning on the transistor UG at the beginning of the second time interval can effectively reduce the inductor current IL generated during the start-up procedure. Note that in the embodiment of the invention, the predetermined short period is shorter than a first switching period corresponding to the first switching frequency and shorter than a second switching period corresponding to the second switching frequency.

Finally, the control circuit turns on the transistors LG and UG by turns according to a second switching frequency in a third time interval (Step S906). Referring to FIG. 10, the third time interval here refers to the time interval after the time T3. In the third time interval, the output voltage VOUT is greater than the input voltage VIN and can be generated stably. According to an embodiment of the invention, the first switching frequency is smaller than the second switching frequency. In addition, according to an embodiment of the invention, the second switching frequency may be the frequency of the clock signal. In other words, in the predetermined time interval T1~T3, the transistors LG and UG are turned on by turns according to a relatively low switching frequency, and after the time T3, the boost converter can operate in a standard PWM mode, such that the transistors LG and UG are turned on by turns according to a normal switching frequency, for example, according to the clock signal.

As discussed above, in the embodiments of the invention, the control circuit 120 may first keep turning on the transistor UG of the boost converter in the time interval 0~T1, and then turn off the transistor UG and turn on the transistor LG at the time T1. After the transistor LG is turned on for a short period, the control circuit 120 may turn off the transistor LG and turn on the transistor UG at the time T2, and then turn on the transistors LG and UG by turns according to a relatively low switching frequency in the time interval T2~T3. When the output voltage VOUT can be stably output, the control circuit 120 may turn on the transistors LG and UG by turns according to a normal switching frequency and meanwhile, the boost converter may operate in the standard PWM mode. By the proposed controlling method, the inductor current IL generated during the start-up procedure can be effectively reduced. As shown in FIG. 10, in the time interval T1~T3, the inductor current IL is smaller than the average current IOUT flowing through the load R. In this manner, the excessive inductor current problem can be solved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A boost converter circuit, comprising:
    a boost converter configured to generate an output voltage at an output terminal according to an input voltage, wherein the boost converter comprises:
        an inductor;
        a first transistor, coupled between the inductor and a ground, configured to be turned on or off according to a first control signal; and
        a second transistor, coupled between the inductor and the output terminal, configured to be turned on or off according to a second control signal; and
    a control circuit, coupled to the boost converter, and configured to generate the first control signal and the second control signal according to a clock signal, and to control the first transistor and the second transistor turning on by turns according to a first switching frequency in a predetermined time interval,
    the first switching frequency being smaller than a frequency of the clock signal, wherein the control circuit comprises:
        a logic controller configured to generate a set signal and a reset signal according to the clock signal and a main-output signal, and output the set signal as the first control signal; and
        a first multiplexer configured to selectively output one of the reset signal and a compare signal as the second control signal according to a start-up signal.

2. The boost converter circuit as claimed in claim 1, wherein the boost converter further comprises a capacitor, coupled to the output terminal, wherein when the output voltage is smaller than the input voltage, the second transistor is kept being turned on to charge the capacitor.

3. The boost converter circuit as claimed in claim 1, wherein when the output voltage is boosted from a value that is smaller than the input voltage to a value that is greater than the input voltage, the second transistor is turned off and the first transistor is turned on.

4. The boost converter circuit as claimed in claim 3, wherein after the first transistor is turned on for a predetermined period, the first transistor is turned off and the second transistor is turned on, and the predetermined period is smaller than a period of the clock signal.

5. The boost converter circuit as claimed in claim 3, wherein when the output voltage is greater than the input voltage, in the predetermined time interval, the first transistor and the second transistor are turned on by turns according to the first switching frequency, and after the predetermined time interval, the first transistor and the second transistor are turned on by turns according to a second switching frequency, and wherein the first switching frequency is smaller than the second switching frequency.

6. A boost converter circuit, comprising:
    a boost converter configured to generate an output voltage at an output terminal according to an input voltage, wherein the boost converter comprises:
        an inductor;
        a first transistor, coupled between the inductor and a ground, and configured to be turned on or off according to a first control signal; and
        a second transistor, coupled between the inductor and the output terminal, and configured to be turned on or off according to a second control signal; and
    a control circuit, coupled to the boost converter, and configured to generate the first control signal and the second control signal according to a clock signal, and to control the first transistor and the second transistor to turn on by turns according to a first switching frequency in a predetermined time interval, the first switching frequency being smaller than a frequency of the clock signal, wherein the control circuit comprises:
        a logic controller configured to generate a set signal and a reset signal according to the clock signal and a main-output signal;
        a flip-flop, coupled to the logic controller, and configured to output a third control signal according to the set signal and the reset signal;
        a timing control circuit, coupled to the flip-flop, and configured to generate the first control signal and a fourth control signal according to the third control signal; and
        a first multiplexer configured to selectively output one of the fourth control signal and a compare signal as the second control signal according to a start-up signal.

7. A boost converter circuit, comprising:
    a boost converter configured to generate an output voltage at an output terminal according to an input voltage, wherein the boost converter comprises:
        an inductor;
        a first transistor, coupled between the inductor and a ground, and configured to be turned on or off according to a first control signal; and
        a second transistor, coupled between the inductor and the output terminal, and configured to be turned on or off according to a second control signal; and
    a control circuit, coupled to the boost converter, and configured to generate the first control signal and the second control signal according to a clock signal, to control the first transistor and the second transistor to turn on by turns according to a first switching frequency in a predetermined time interval, the first switching frequency being smaller than a frequency of the clock signal, wherein the control circuit comprises:

a logic controller configured to generate a set signal and a reset signal according to the clock signal and a main-output signal, wherein the logic controller comprises:

a first subcircuit configured to generate the set signal according to the clock signal, wherein the first subcircuit comprises:

a divider circuit configured to receive the clock signal and divide the frequency of the clock signal to generate one or more divided signals; and a second multiplexer configured to receive the clock signal and the one or more divided signals and selectively output one of the clock signal and the one or more divided signals as the set signal.

8. A boost converter circuit, comprising:

a boost converter configured to generate an output voltage at an output terminal according to an input voltage, wherein the boost converter comprises:

an inductor;

a first transistor, coupled between the inductor and a ground, and configured to be turned on or off according to a first control signal; and a second transistor, coupled between the inductor and the output terminal, and configured to be turned on or off according to a second control signal; and a control circuit, coupled to the boost converter, and configured to generate the first control signal and the second control signal according to a clock signal, to control the first transistor and the second transistor to turn on by turns according to a first switching frequency in a predetermined time interval, the first switching frequency being smaller than a frequency of the clock signal, wherein the control circuit comprises:

a logic controller configured to generate a set signal and a reset signal according to the clock signal and a main-output signal, wherein the logic controller comprises:

a second subcircuit configured to generate the reset signal according to the main-output signal, wherein the second subcircuit comprises:

a one-shot circuit configured to generate a one-shot signal according to a start-up signal; and an OR logic gate configured to receive the one-shot signal and the main-output signal and output an OR logic operation result of the one-shot signal and the main-output signal as the reset signal.

* * * * *